(12) United States Patent
Bühler et al.

(10) Patent No.: US 6,282,415 B1
(45) Date of Patent: *Aug. 28, 2001

(54) POWER SUPPLY IN THE STANDBY MODE

(75) Inventors: Olaf Bühler, Lahnau; Karl-Heinz Knobl, Limburg, both of (DE)

(73) Assignee: U.S. Philips Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/262,099

(22) Filed: Mar. 4, 1999

(30) Foreign Application Priority Data

Mar. 7, 1998 (DE) .............................. 198 09 905

(51) Int. Cl.⁷ .......................... H04B 10/00; H02M 3/335; G05F 1/56
(52) U.S. Cl. .......................... 455/343; 455/572; 455/574; 363/40
(58) Field of Search .................... 455/343, 571, 455/572, 573, 574; 363/41, 40

(56) References Cited

U.S. PATENT DOCUMENTS

| | | | |
|---|---|---|---|
| 5,027,052 | * | 6/1991 | Bauch et al. ............................ 363/41 |
| 5,627,882 | * | 5/1997 | Chien et al. ............................ 455/574 |
| 5,689,407 | * | 11/1997 | Marinus et al. ......................... 363/21 |
| 5,758,278 | * | 5/1998 | Lansdowne ............................. 455/343 |
| 5,778,312 | * | 7/1998 | Kawashima ............................. 455/343 |
| 5,784,268 | * | 7/1998 | Steffek et al. .......................... 363/41 |
| 5,806,006 | * | 9/1998 | Dinkins ................................. 455/574 |
| 5,903,601 | * | 5/1999 | Elnashar et al. ....................... 455/574 |
| 5,950,120 | * | 9/1999 | Gardner et al. ........................ 455/574 |
| 5,953,646 | * | 9/1999 | Hirasawa ............................... 455/343 |
| 5,982,642 | * | 11/1999 | Herfurth ................................ 363/41 |
| 5,987,339 | * | 11/1999 | Asano ................................... 455/574 |
| 6,091,527 | * | 7/2000 | Brisse et al. .......................... 359/143 |

OTHER PUBLICATIONS

"Calll–by–Call Activation Technique for Fiber–Optic Subscriber Transmission Units", by Nagata et al., IEEE Transactions on Communications, vol. COM–35, No. 12, Dec. 1987.

* cited by examiner

*Primary Examiner*—Lee Nguyen
*Assistant Examiner*—Simon Nguyen

(57) ABSTRACT

In order to reduce the power consumption of users of a bus in the standby mode, the components in the receivers of the bus users which are required to wake up the bus users are clocked via the supply voltage. Two parameters, i.e. period duration and pulse duty factor, determine the response time of the subscriber and also to what extent the power consumption is reduced.

2 Claims, 1 Drawing Sheet

POWER SUPPLY IN THE STANDBY MODE

BACKGROUND OF THE INVENTION

The invention relates to a device as disclosed in the introductory part of Claim 1.

For example, in optical bus systems the users of the bus are switched to a standby mode so as to reduce the power consumption. Nevertheless, in this state power is still required, for example in order to maintain the receiver of the individual users in the standby state. This minimized power consumption may still be too high for given applications, because the users are often battery powered. Thus, a reduction of the power consumption would prolong the availability of the battery-powered users and also enable a reduction of the battery size and the weight.

The article "Call-by-Call Activation Technique for Fiber-Optic Subscriber Transmission Units" in IEEE Transactions on Communications, Vol. COM-35, No. 12, December 1987, pp. 1297 to 1302, describes an optical transmission system in which the components receive a voltage only during the data transmission. In the absence of data transmission, only a few components, inter alia including the optical receiver, continuously receive a voltage. This supply voltage is provided by batteries. A reduction of the power consumption would minimize the batteries and hence the weight.

SUMMARY OF THE INVENTION

Therefore, it is an object of the invention to provide a device which reduces the power required for the receiver in the standby mode, however, without its operation being affected.

This object is achieved by means of the steps disclosed in the characterizing part of Claim 1.

The response time of the receiver can be influenced by variation of the frequency and the pulse duty factor. The higher the frequency, the less time will be required by the receiver so as to initiate a wake-up procedure in the user of the bus.

The pulse duty factor determines the factor whereby the power consumption in the means is reduced. For example, if the power consumption is to be reduced to one quarter of the original value, a pulse duty factor of 1:3 should be selected and adjusted in the circuit.

The period of time during which the receiver is in the standby mode, for example because it does not receive modulated light, is substantially longer than the period of time during which modulated light arrives. As a result of this ratio a large amount of power is saved.

BRIEF DESCRIPTION OF THE DRAWING

An embodiment according to the invention will be described in detail hereinafter with reference to the Figures. Therein.

DESCRIPTION OF THE PREFERRED EMBODIMENTS

Figure 1:
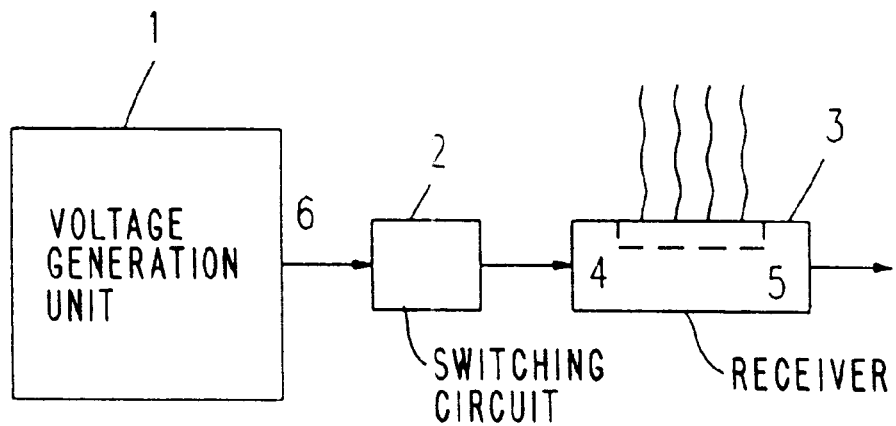
FIG. 1 shows a block diagram for the clocked power supply of receivers in optical bus systems.

FIG. 1 shows a device which consists of a unit 1, a switching means 2 and the receiver 3. The clocked supply voltage is generated in the unit 1 and the output signal 6 is applied to a switching means 2 which applies the clocked supply voltage to the appropriate input 4 of the receiver 3. The receiver 3 indicates on the status pin 5 whether modulated light arrives or not. The arrival of modulated light is signaled on the status pin 5 and a wake-up procedure is initiated in the user of the bus. The bus user remains in the standby mode for as long as the receiver 3 does not receive modulated light. It is only when the optical bus user has been switched on that the receiver 3 no longer receives a clocked voltage, as in the standby mode, but a continuous voltage.

Figure 2:
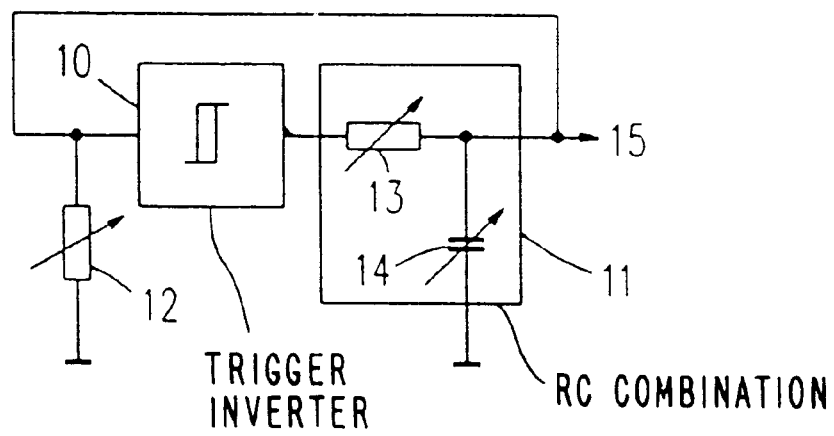
FIG. 2 shows the circuit arrangement for generating the clock pulses.

FIG. 2 shows the circuit arrangement for generating a clocked supply voltage, consisting of a Schmitt trigger inverter 10, a variable resistor 12 which is connected to the input of the Schmitt trigger inverter 10, and an RC combination 11 which consists of a variable resistor 13 and a variable capacitor 14. The output signal 15 represents the output signal 6 of the unit 1 and is applied, via the switch means 2, to the voltage input 4 (FIG. 1) of the receiver 3.

The pulse which is generated in the circuit of FIG. 2 and is output via the output signal 15 can be influenced by variable parameters of the components. The potentiometer 12 preceding the input of the Schmitt trigger inverter 10 enables adjustment of the pulse duty factor of the clocked supply voltage. The pulse duty factor, describing the ratio of the length of the switched-on phases to the length of the switched-off phases during a clock period, adjusts the factor for reducing the power consumption. The larger the ratio of the two phases, the more current will be saved. The frequency of the clocked supply voltage is a further parameter in this respect and can be varied by variation of the time constant of the RC member 11. The time constant is a product of the variable values of the potentiometer 13 and the variable capacitor 14. The frequency is used to adjust the period of time required by the receiver 3 so as to signal the arrival of modulated light on the status pin 5 and to initiate a wake-up procedure for the user of the bus. The higher the frequency, the shorter the response time of the receiver 3 for intiating the wake-up procedure will be.

The parameters can be varied only within the limits within which the functioning of the overall system is not affected.

What is claimed is:

1. A device for supplying voltage to a receiver in an optical bus system, comprising:
    a circuit arrangement with components whose parameters can be varied; and
    a switching circuit for supplying the receiver with said voltage, whereby a generated voltage of the circuit arrangement is applied to the switching circuit;
    wherein:
       in a standby mode the voltage applied to the receiver is clocked and a clock signal is generated;
       response time of the receiver is controlled via frequency of the clock signal;
       frequency of the voltage generated by the circuit arrangement can be influenced by a variation of a time constant;
       a status signal is provided to a status pin when the receiver receives light to switch the receiver to an active mode; and
       in the active mode, when the receiver receives light a continuous voltage is applied to the receiver.

2. A device as recited in claim 1, characterized in that the amount of power saved is related to the pulse duty factor by a ratio which is adjustable by varying the parameters of the circuit arrangement.

* * * * *